006
United States Patent [19]

Signoretto

[11] 4,202,803
[45] May 13, 1980

[54] RUBBER COMPOSITION CONTAINING GROUND GRAMINACEOUS RICE PRODUCT ESPECIALLY FOR MANUFACTURING MOLDED PANELS

[76] Inventor: Teresio Signoretto, Frazione Allivellatori 61, Cumiana (Turin), Italy

[21] Appl. No.: 917,228

[22] Filed: Jun. 20, 1978

[30] Foreign Application Priority Data

Jun. 20, 1977 [IT] Italy ............................... 68427 A/77

[51] Int. Cl.² ................................................ C08L 5/00
[52] U.S. Cl. ........................... 260/17.4 BB; 260/17 R; 428/496
[58] Field of Search ...................... 260/174 R, 174 BB

[56] References Cited

U.S. PATENT DOCUMENTS

| 2,414,803 | 1/1947 | D'Alelio | 260/17.4 BB |
| 2,585,219 | 2/1952 | Boyle | 260/17.4 BB |
| 3,379,662 | 4/1968 | Bramble et al. | 260/17.4 BB |
| 3,867,250 | 2/1975 | Jankowiak et al. | 260/17.4 BB |

FOREIGN PATENT DOCUMENTS

| 48-20773 | 6/1973 | Japan | 264/122 |
| 48-20774 | 6/1973 | Japan | 264/122 |
| 48-20775 | 6/1973 | Japan | 264/122 |

*Primary Examiner*—Edward M. Woodberry
*Attorney, Agent, or Firm*—Sughrue, Rothwell, Mion, Zinn and Macpeak

[57] ABSTRACT

A composition for the manufacture of a vulcanized rubber includes, in addition to elastomers, vulcanizing agents, anti-ageing agents and other known additives, a filler comprising finely-divided, dry waste products from the extraction of grain from cereal crops, such as stalks, husks and chaff and particularly rice chaff.

9 Claims, No Drawings

RUBBER COMPOSITION CONTAINING GROUND GRAMINACEOUS RICE PRODUCT ESPECIALLY FOR MANUFACTURING MOLDED PANELS

The present invention relates to a rubber composition for the manufacture of vulcanized rubber products particularly for use in making flat or shaped panels for motor-vehicle interiors, but also for furniture, packaging and other articles for technical and domestic use.

Known rubber compositions normally consist of one or more kinds of elastomer, vulcanizing agents (including cross-linking agents, accelerants, activators and possibly retardants), plasticizers, anti-ageing agents, dyes, deodorants, and finally strengthening and/or inert fillers.

The inert fillers, for example, calcium carbonate, barium sulphate, talc, some kinds of kaolin, reclaimed products, adulterants and tars, are added to reduce the cost of the mixture rather than to bestow any special physical and/or chemical characteristics on the vulcanized product. The quantity of such fillers included in a rubber mixture, however, must often be reduced in favour of strengthening fillers which can improve the resistance to tearing, the modulus of tensile elasticity and breakage load of the rubber.

The most widely used strengthening filler for rubber is lampblack, although non-black fillers such as very fine silicas, precipitated calcium carbonates, calcium and aluminium silicates, titanium dioxide and zinc oxide are also used.

All these products, especially that most widely used, that is, the lampblack, are very costly, and at the same time their use does not conform well to the requirements of cleanliness in the working environment and the requirements of ecology in general.

The object of the present invention is to avoid these disadvantages while, at the same time, providing a rubber composition suitable for the uses mentioned above, without reduced strength characteristics.

According to the present invention there is provided a composition for the manufacture of a vulcanized rubber including an elastomer and a vulcanizing agent and a filler consisting of dried husks, including cobs, and/or stalks and/or chaff from a graminaceous crop.

The rubber composition may also include any of the other components, mentioned above, such as plasticizers, dyes and inert fillers in proportions such as to give desired properties.

Although graminaceous crops include all grasses, the preferred crops used in the present invention are cereals, especially oats, wheat, barley, maize and rice. The filler preferably comprises waste products from the extraction of grain from these crops, particularly from the threshing process.

The particle size of the graminaceous filler product may be varied according to the intended use of the finished rubber: the product in some cases may be ground to a powder having a particle size of the same order as very fine flour while for other uses it may be chopped to give much larger particles.

The graminaceous products are preferably added to a composition in quantities of from 0.1 to 5 times the total weight of the other substances in the composition.

Preferred embodiments of a composition according to the present invention contain the substances given in the following table mixed in proportions which may be varied within the limits given:

| Components | Parts by weight |
| --- | --- |
| natural rubber | 30 to 70 |
| synthetic rubber | 30 to 70 |
| zinc oxide | 3 to 8 |
| sulphur | 2 to 8 |
| accelerants | 0.5 to 3 |
| anti-ageing agent | 0.5 to 2 |
| stearic acid | 0.5 to 2 |
| Further additives | |
| dye | 0-10% by weight |
| deodorant | 0-5% by weight |
| fireproofing agent | 0-10% by weight |
| ground graminaceous filler | 0.1 to 5 times the total weight of the components and further additives listed above. |

EXAMPLE

One embodiment of a composition according to the invention which is particularly suitable for the production of panels is given in the following table, by way of example:

| Components | Parts by weight |
| --- | --- |
| natural rubber | —50 |
| synthetic rubber | —50 |
| zinc oxide | —5 |
| sulphur | —4 |
| accelerants | —1.3 |
| anti-ageing agents | —1 |
| stearic acid | —1 |
| Further additives | |
| deodorant | —1% by weight of the total weight of the above components |
| fireproofing agent | —2% by weight of the total weight of the above components |
| ground graminaceous filler | 3 times the total weight of the above components and further additives. |

It is found that chaff, especially rice chaff, gives particularly good results as a strengthening filler. The chaff is preferably subjected to a purifying process and to treatments to improve its antirot properties and its porosity prior to use.

The compositions may be prepared, moulded and vulcaninized by methods which do not differ substantially from known methods for known compositions used for similar purposes. They may also be used in processes involving injection moulding and subsequent vulcanization.

What is claimed is:

1. In a composition for the manufacture of a vulcanized rubber for manufacturing a moulded panel including an elastomer and a vulcanizing agent, the improvement wherein the composition further includes as a filler, at least one member selected from the group consisting of rice husks and rice chaff.

2. A composition as in claim 1, wherein said filler results from the threshing of the grain heads of said rice.

3. A composition as in claim 1, wherein said filler is rice chaff.

4. A composition as in claim 1, wherein said filler is included in quantities of from 0.1 to 5 times the total weight of the other substances in said composition.

5. A composition as in claim 1, further including one of the following substances which are known per se: an anti-ageing agent; a plasticizer; a deodorant; a dye.

6. A composition as in claim 1, consisting essentially of the following substances mixed in the following proportions by weight:

| Components | Parts by weight |
|---|---|
| natural rubber | 30 to 70 |
| synthetic rubber | 30 to 70 |
| zinc oxide | 3 to 8 |
| sulphur | 2 to 8 |
| accelerants | 0.5 to 3 |
| anti-ageing agents | 0.5 to 2 |
| stearic acid | 0.5 to 2 |
| Further additives | |
| dye | 0–10% by weight of the total weight of said components |
| deodorant | 0–5% by weight of the total weight of said components |
| fireproofing agent | 0–10% by weight of the total weight of said components |
| at least one finely-divided filler selected from the group consisting of rice husks and rice chaff | 0.1 to 5 times the total weight of the components and further additives listed above. |

7. A composition as in claim 6, consisting essentially of the following substances mixed in the following proportions by weight:

| Components | Parts by weight |
|---|---|
| natural rubber | 50 |
| synthetic rubber | 50 |
| zinc oxide | 5 |
| sulphur | 4 |
| accelerants | 1.3 |
| anti-ageing agent | 1 |
| stearic acid | 1 |
| Further additives | |
| deodorant | 1% by weight of the total weight of said components |
| fireproofing agent | 2% by weight of the total weight of said components |
| at least one finely-divided filler selected from the group consisting of rice husks and rice chaff | 3 times the total weight of the above components and further additives. |

8. A vulcanised rubber made from the composition of claim 1.

9. A composition as in claim 1, wherein said filler is rice husks.

* * * * *